United States Patent Office 2,808,414
Patented Oct. 1, 1957

2,808,414

CHEMICAL COMPOUND, 5-NITRO-2-FURALDEHYDE 4-(p-ARSONOPHENYL) SEMICARBAZONE, AND THE NONTOXIC, WATER-SOLUBLE SALTS THEREOF

William C. Ward, Norwich, N. Y., assignor to The Norwich Pharmacal Company, Norwich, N. Y., a corporation of New York No Drawing. Application April 9, 1956,
Serial No. 576,813

5 Claims. (Cl. 260—347.3)

This invention relates to a group of new chemical compounds comprising 5-nitro-2-furaldehyde 4-(p-arsonophenyl) semicarbazone represented by the formula:

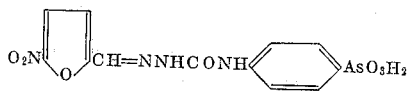

and its non-toxic, water-soluble salts.

The members of my new group of compounds are useful in treating chickens infected with coccidiosis. Cecal coccidiosis is a widespread and serious disease of chickens. It is often fatal and, even when birds survive this disease, they suffer a substantial weight loss with a corresponding financial loss to the poultryman. In the past, drugs have been administered to chickens to combat coccidiosis. Those drugs have been administered to poultry as a preventive measure or as a curative measure, but their effect on birds infected with the disease has been limited to reduction in the mortality rate. Such drugs have not overcome the weight loss referred to above which has invariably attended coccidiosis in the past.

I have discovered that when my new chemical compound, 5-nitro-2-furaldehyde 4-(p-arsonophenyl) semicarbazone, or a non-toxic, water-soluble salt thereof, is administered to chickens infected with coccidiosis, astonishing results are produced in the weight gain of surviving birds during the period when the effects of the infection on the weight of birds are normally most serious. This result is most surprising because my new compounds do not, by themselves, appear to effect any noteworthy reduction in the mortality rate of infected birds. This is demonstrated by the results of the following tests:

Chickens which were purchased from commercial hatcheries, and which were brooded in electric battery brooders until two weeks old, were sorted into groups of similar weight. After four days, each chicken was infected with 50,000 to 60,000 sporulated oocysts of *Eimeria tenella*, a causative organism of cecal coccidiosis. Medication with my new drug was commenced immediately after the infection was induced and was continued for one week. A suitable control group of unmedicated infected chickens was maintained for comparative purposes. The findings made in such tests are set forth in the following table which covers the period when the effect of the infection upon the rate of growth is most severe, namely, the fourth to eleventh days post infection. In the table, for the sake of brevity, 5-nitro-2-furaldehyde 4-(p-arsonophenyl) semicarbazone is referred to as "NPA acid" and the sodium salt thereof is referred to as "NPA sodium salt":

TABLE

| Treatment | No. of Birds | Mean Weight in Grams | | | Weight Gain (in Grams) | Deaths |
|---|---|---|---|---|---|---|
| | | Day of Infection | 4 Days Post Infection | 11 Days Post Infection | | |
| Control | 16 | 82.1 | 113.5 | 152.4 | 38.9 | 5 |
| 0.011% NPA acid in feed | 16 | 86.1 | 121.3 | 175.1 | 53.8 | 2 |
| Control | 20 | 98.3 | 123.1 | 159.9 | 36.8 | 12 |
| 0.005% NPA sodium salt in feed | 20 | 101.0 | 132.1 | 183.6 | 51.5 | 5 |
| Control | 20 | 130.8 | 159.5 | 148.8 | −10.7 | 6 |
| Do | 20 | 136.5 | 168.5 | 168.5 | 0 | 7 |
| 0.01% NPA sodium salt in water | 20 | 129.4 | 166.8 | 193.7 | 26.9 | 8 |
| Do | 20 | 130.1 | 161.8 | 201.6 | 39.8 | 4 |
| Do | 20 | 126.7 | 161.9 | 174.3 | 12.4 | 8 |
| Do | 20 | 124.3 | 153.0 | 164.5 | 11.5 | 7 |

It will be noted from the foregoing table that the administration to an infected chicken of a small amount of my new drug will produce highly beneficial results; the quantity which was used was within the range of about 0.005% to 0.011% by weight of the drinking water or the diet, and this level, which represents from about 50 gms. to 100 gms. per ton of feed, has provoked no evidence of toxicity in chickens. In mice, the highest tolerated dose of 5-nitro-2-furaldehyde 4-(p-arsonophenyl) semicarbazone is about 770 mg./kg. and that of its sodium salt greater than 1000 mg./kg., demonstrating absence of highly toxic properties in these compounds.

The administration of the members of my new group of compounds to chickens is easy. The 5-nitro-2-furaldehyde 4-(p-arsonophenyl) semicarbazone may be admixed with the feed, or a non-toxic, water-soluble salt thereof may be incorporated in the drinking water supply of the birds to be treated and, when administered in conjunction with drugs of the type which have been used in the past to cure chickens infected with coccidiosis, it plays a very important and useful part in preventing the loss of weight which has previously attended cecal coccidiosis in chickens.

The method which I now prefer to follow in the preparation of my new compound, 5-nitro-2-furaldehyde 4-(p-arsonophenyl) semicarbazone, consists in condensing 4-(p-arsonophenyl) semicarbazide (the preparation of which is known—see German Patent No. 497,807) with 5-nitro-2-furaldehyde, or with a reactive derivative thereof such as 5-nitro-2-furaldehyde diacetate, in the presence a strong acid (hydrochloric acid will give good results) according to the following reaction:

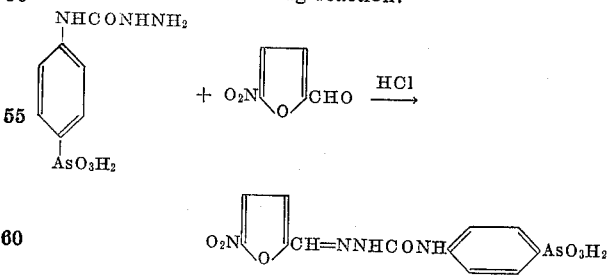

An alternative method of preparing that new compound consists in using, in place of 4-(p-arsonophenyl) semicarbazide, the corresponding semicarbazones of benzaldehyde or other aldehydes which can be exchanged by the 5-nitro-2-furaldehyde group under acid conditions.

When it is desired to administer a compound of my invention by dissolving it in the drinking water of the fowl to be treated, the acid, 5-nitro-2-furaldehyde 4-(p-arsonophenyl) semicarbazone, is solubilized by converting it into a non-toxic, water-soluble salt, e. g., the sodium, potassium or ammonium salt thereof, by reacting such acid with sodium hydroxide, potassium hydroxide or ammonium hydroxide.

In order that my invention may be fully available to those skilled in the art, the following representative examples are given:

*Example I*

A suspension of 20 grams of 4-(p-arsonophenyl) semicarbazide (German Patent No. 497,807) in 300 cc. of water is treated with hydrochloric acid until a clear solution results. To this solution is added, slowly with stirring, a solution of 11 grams of 5-nitro-2-furaldehyde in 50 cc. of ethyl alcohol. The resulting precipitate is removed by filtration, washed with ethyl alcohol and dried. A yield of 26 grams, 90%, of 5-nitro-2-furaldehyde 4-(p-arsonophenyl) semicarbazone is obtained. When the material is recrystallized from a mixture of 150 cc. of N,N-dimethyl-formamide and 40 cc. of water, 19 grams, M. P. 215° (with decomposition) is recovered.

In the above example, an equivalent amount of 5-nitro-2-furaldehyde diacetate may be substituted for 5-nitro-2-furaldehyde.

The monosodium salt is obtained in the following fashion:

*Example II*

A suspension of 5 grams of 5-nitro-2-furaldehyde 4-(p-arsonophenyl) semicarbazone in 25 cc. of water is treated with 21.4 cc. of a 0.56 N sodium hydroxide solution slowly with stirring. A small amount of insoluble material is removed by filtration and the filtrate is poured into 100 cc. of absolute alcohol. The resulting precipitate is removed by filtration and well washed with ether. The product, after air drying, weighs 4.9 grams.

In the above example, an equivalent amount of potassium hydroxide or ammonium hydroxide may be substituted for the sodium hydroxide.

What I claim is:

1. A member of the group consisting of the chemical compound 5 - nitro - 2 - furaldehyde 4-(p-arsonophenyl) semicarbazone represented by the formula:

and the non-toxic, water-soluble salts thereof.

2. 5-nitro-2-furaldehyde 4 - (p-arsonophenyl) semicarbazone.

3. The sodium salt of 5-nitro-2-furaldehyde 4-(p-arsonophenyl) semicarbazone.

4. The potassium salt of 5-nitro-2-furaldehyde 4-(p-arsonophenyl) semicarbazone.

5. The ammonium salt of 5-nitro-2-furaldehyde 4-(p-arsonophenyl) semicarbazone.

References Cited in the file of this patent

UNITED STATES PATENTS

| | | |
|---|---|---|
| 2,656,350 | Ward et al. | Oct. 20, 1953 |
| 2,663,710 | Hayes | Dec. 22, 1953 |
| 2,710,874 | Freund | June 14, 1955 |
| 2,726,241 | Gever et al. | Dec. 6, 1955 |